(12) United States Patent
Kato

(10) Patent No.: US 6,547,441 B2
(45) Date of Patent: Apr. 15, 2003

(54) CAM MECHANISM

(75) Inventor: Heizaburo Kato, Shizuoka (JP)

(73) Assignee: Sankyo Manufacturing Co., Ltd., Tokyo (JP)

( * ) Notice: Subject to any disclaimer, the term of this patent is extended or adjusted under 35 U.S.C. 154(b) by 17 days.

(21) Appl. No.: 10/010,335

(22) Filed: Oct. 22, 2001

(65) Prior Publication Data

US 2002/0048420 A1 Apr. 25, 2002

(30) Foreign Application Priority Data

Oct. 25, 2000 (JP) ........................ 2000-325630

(51) Int. Cl.[7] .................... F16C 19/50; F16H 1/16
(52) U.S. Cl. ............................... 384/447; 74/425
(58) Field of Search ........................ 384/447, 569, 384/618; 74/425

(56) References Cited

U.S. PATENT DOCUMENTS

| | | | |
|---|---|---|---|
| 3,710,640 A | 1/1973 | Stanger et al. | 74/425 |
| 4,065,192 A | 12/1977 | Sague | 384/569 |
| 4,606,654 A | 8/1986 | Yatsu et al. | 384/447 |
| 5,441,350 A | * 8/1995 | Fujita | 384/447 |
| 5,961,221 A | * 10/1999 | Kamimura | 384/447 |

FOREIGN PATENT DOCUMENTS

| | | |
|---|---|---|
| GB | 935448 | 7/1962 |
| JP | 6-288453 | 10/1994 |
| JP | 09-297145 | 5/1996 |
| JP | 9-250608 | 9/1997 |
| JP | 9-280325 | 10/1997 |
| JP | 09-297145 | 11/1997 |
| JP | P2000-186718 A | 7/2000 |

* cited by examiner

Primary Examiner—Thomas R. Hannon
(74) Attorney, Agent, or Firm—Harness, Dickey & Pierce, P.L.C.

(57) ABSTRACT

A cam mechanism incorporating a highly precise bearing structure that improves the dynamic stability of the cam mechanism's rotating output component. Relevant structures consist of a worm gear driven rotating shaft driving a rotating output shaft supported by a cross roller bearing assembly incorporating V-shaped inner and outer bearing races that sandwich and ride over a set of rollers. Of particular note is that the outer or inner bearing race may be formed as a groove machined directly into the circumferential surface of the output shaft. Because the outer bearing race is a ring-shaped structure that concentrically surrounds the rotating output shaft, the output shaft and bearing races can be machined simultaneously as a single workpiece to assure a high degree of concentricity between the shaft and bearing races.

12 Claims, 16 Drawing Sheets

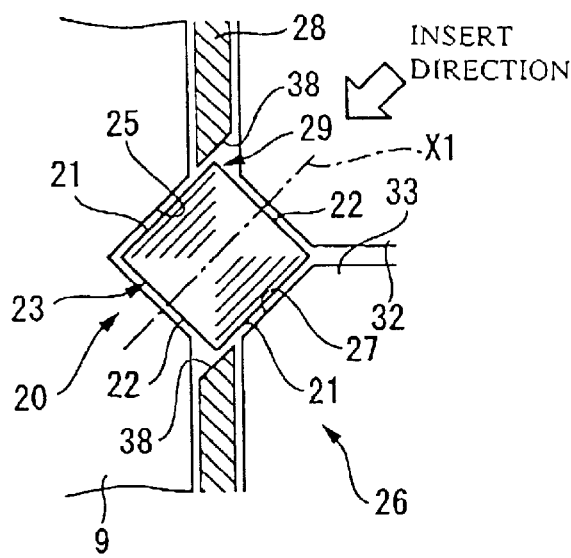
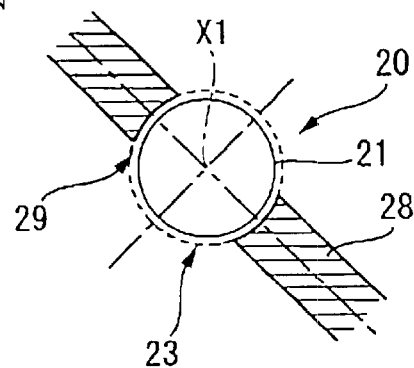
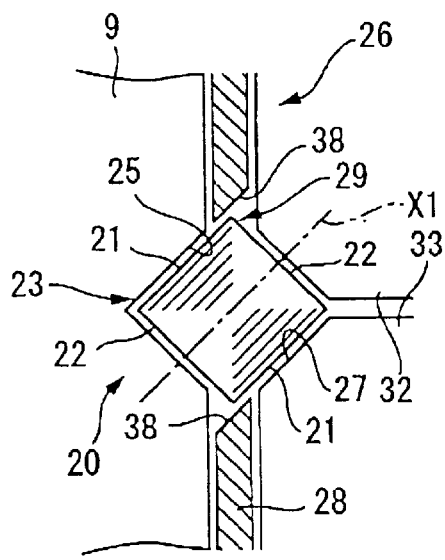
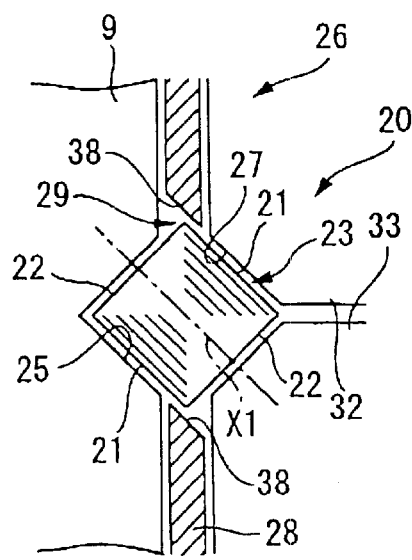

CAM MECHANISM

BACKGROUND OF THE INVENTION

1. Field of the Invention

The invention relates to a cam mechanism that incorporates a highly precise bearing assembly capable of significantly improving the dynamic and static positional stability of the cam mechanism's output shaft.

2. Description of the Current Art

Various types of intermittent indexing-type cam mechanisms are currently known in the art. These cam mechanisms incorporate input and output shafts as means of transferring torque into and out of the cam mechanism, and two bearings, axially aligned with and located at each of the input and output shafts as means of supporting both thrust and radial loads applied during operation of the cam mechanism. Tapered roller bearings are generally used in cases where the input and output shafts must operate with a high degree of precision.

FIGS. 20 and 21 show cam mechanism 1a in which input shaft 4 is rotatably supported at both ends by tapered roller bearings 3 mounted in housing 2. Globoid cam 5 is axially formed on input shaft 4. Output shaft 7, whose rotating axis is offset 90-degrees in relation to that of input shaft 4, is rotatably supported by tapered roller bearings 6 mounted at both ends of the shaft and supported by housing 2. Turret 9 is installed to or integrally formed as part of output shaft 7 and incorporates cam followers 8 installed in a radial pattern on the axial perimeter of shaft 7. Turret 9 and cam followers 8 are dimensioned so as to allow cam followers 8 to mesh with spiral channel 10 of globoid cam 5. The rotation of input shaft 4 results in the rotation of output shaft 7 by means of cam followers 8 following the transverse movement of globoid cam valley 10.

FIGS. 22 and 23 illustrate the structure of cam mechanism 1b which, similar to cam mechanism 1a, incorporates input shaft 4 and output shaft 7. In cam mechanism 1b, output shaft 7 is formed as a ring-type structure that radially encompasses hollow cylindrical part 11 integrally formed at the center of housing 2. Radial and thrust loads applied to output shaft 7 are born by housing 2 as will be explained. Multiple first cam followers 12 are installed in a radial pattern on the perimeter of the inwardly facing radial surface of input shaft 7. First cam followers 12 slide along cylindrical surface 13 provided by housing 2 as means of bearing radial loads applied to input shaft 7. Second cam followers 8 are installed to the outwardly facing perimeter of output shaft 7 and are located so as to mesh with cam valley 10 of globoid cam 5. Support piece 15, structured so as not to interfere with the rotation of globoid cam 5, is installed within housing 2, and ring flange 16, formed as part of housing 2, is located radially opposite to support piece 15. Second cam followers 8 pass through the space provided between support piece 15 and ring flange 16, thus forming a structure whereby support piece 15 and ring flange 15 are able to bear the thrust loads applied to output shaft 7. Torque applied to input shaft 4 is transferred to output shaft 7 through the rotation of globoid cam 5 driving cam followers 8, thus providing a mechanism through which the desired rotational position of output shaft 7 is controlled through the rotation of input shaft 4.

Modern industry is being called upon to produce various types of components that must be made smaller and to more precise dimensions. This requirement has resulted in a demand for cam mechanisms that are able to operate with an extremely high degree of precision. It is proving difficult to make conventional cam mechanism structures operate with the degree of precision now required by many industrial applications. Even with the use of precision tapered roller bearings, conventional cam mechanisms cannot provide the high degree of operating precision called for in certain applications. This problem is the result of using standard commercial grade bearings in the construction of the cam mechanism, the difficulty of machining the housing, turret, and output shaft flanges to extremely tight tolerances, the difficulty of maintaining the required dimensions during assembly, and a general fall-off in dimensional accuracy that results from a combination of problems encountered during the manufacturing process. As a result, manufacturers often need to disassemble cam mechanisms that don't perform to specification, check and re-machine components, and re-assemble the cam mechanism to ascertain if the required operational specifications have been met.

A major problem encountered with the use of standard roller bearings is that the bearing is unable to deliver adequate performance after being installed as a component of the cam mechanism. The following discussion will explain some of the shortcomings that can be encountered when installing a roller bearing into the cam mechanism.

1: One problem is that gap can be generated between the axial surface of output shaft (a) and the inner circumference of the bearing race. Although the perimeter of output shaft (a) and the inner diameter of race (c) may be fabricated to perfectly concentric shapes, gap (d) can exist, as illustrated in FIG. 24, after the cam mechanism is assembled as a result of the diameter of inner race (c) being fabricated to a slightly large diameter. The operating precision of the cam mechanism is thus adversely affected due to gap (d) causing the misalignment of centerline (e) of output shaft (a) with centerline (f) of bearing (b). Moreover, variations in the radial load may continually change the position of gap (d), thus creating abrasion between output shaft (a) and inner race (c), a problem that results in a shortened service life for the cam mechanism.

2: There is also a problem in that the perimeter of output shaft (a) cannot always be made to a perfectly concentric shape. In order to prevent a gap from forming between the output shaft and bearing race (see the preceding paragraph), some cam mechanisms utilize press fit tolerances in the assembly of output shaft (a) to bearing (b). As shown in FIG. 25, an eccentrically shaped cross section of output shaft (a) can be transferred the inner race (c) of bearing (b) as a result of the press fit, thus distorting bearing race surface (h) that was fabricated to the specified shape and tolerances. As a result of the distorted contours of bearing race surface (h), excessive pressure is applied to some rollers (g) while others fail to contact the race surface, thus creating an eccentric roller path that degrades the bearing's rotating accuracy and makes it difficult for the cam mechanism to operate with a high degree of precision. Moreover, excessive pressure applied between rollers (g) and race surface (h) causes excessive wear that shortens the service life of the cam mechanism.

3: Another problem that can arise is an eccentric shape of the inner surface of race (c) that results in the inner contour of the race not accurately matching the perimeter contour of output shaft (a). FIG. 26 provides a view of bearing (b) before (FIG. a) and after (FIG. b) insertion of output shaft (a) into the bearing race. Even though output shaft (a) may be formed to perfect concentricity, inserting the output shaft into the eccentrically shaped internal diameter of race (c) will transfer the eccentric shape to the race surface (h) and thereby distort the race and bearing surface on which the rollers ride (FIG. b).

4: Furthermore, it can prove difficult to maintain an accurate 90-degree angle between output shaft (a) and seating surface (i) of bearing (b). As shown in FIG. 27, radial flange (j) is provided on output shaft (a) as means of locating bearing (b). In cases where the machining process utilized to form flange (j) leaves metal particles or other debris on the flange surface, bearing (b) will not seat completely by becoming slightly cocked on the shaft, a problem that will result in a falloff of the rotating precision of the cam mechanism's output shaft resulting from the misalignment of center (e) of output shaft (a) and center (f) of bearing (b).

The preceding discussion explained the problems that can arise when mounting roller bearing (b) to output shaft (a). These problems can occur even when using high grade bearings, thus making it difficult to maintain precision operation of the cam mechanism's output shaft. In light of these shortcomings, there is a pronounced need in the art for an improved bearing structure that will assure and maintain high precision operation of the cam mechanism.

SUMMARY OF THE INVENTION

The invention puts forth a structure for a cam mechanism whereby an improved bearing structure is utilized as means of obtaining highly precise dynamic rotation and static positioning of the cam mechanism's output shaft.

The cam mechanism put forth by the invention is comprised of a cam driven rotating shaft and a cross roller bearing installed to a support structure, the cross roller bearing being provided as means of rotatably supporting the rotating shaft. Said cross roller bearing is comprised of a V-shaped outer race, a V-shaped inner race, multiple rollers located between the race parts, a roller retainer part located between the inner and outer races, and a circumferential groove, existing as the V-shaped groove of the internal or outer race, formed concentric with the rotating axis of the rotating shaft.

Because the circumferential groove can be formed in either the inner or outer race and concentrically located around the rotating axis of the rotating shaft, it becomes possible to machine the inner or outer race concentrically to the same center as the rotating shaft because the machining of the inner or outer race can be executed together with the machining of the rotating shaft itself with either one of the races attached to the rotating shaft. This structure establishes a high degree of concentricity between the bearing components and rotating shaft and thus eliminates the need to use of standard commercially available roller bearings that often exhibit defects such as imperfectly formed races and eccentrically shaped race surfaces. As the inner or outer race can be machined together in the same process applied to machine the rotating shaft, the difficulty of obtaining the desired performance from a cam mechanism using conventional roller bearings is eliminated, thus allowing the manufacture of a cam mechanism able to operate with a higher degree of precision.

An important characteristic of the invention is that the circumferential groove can be directly formed on the outer or inner perimeter of the rotating shaft simultaneously with the machining of the rotating shaft itself. During the machining process the radial center of the inner or outer races can be formed in perfect concentricity with the radial center of the rotating shaft, thus creating a bearing and rotating shaft structure capable of operating with an extremely high degree of dynamic and static precision.

A primary characteristic of the invention is that the rollers, in addition to being located between the inner and outer races, have their axial centers inclined toward the axial center of the rotating shaft, and are arranged in a radial pattern in which the axial center of each roller is inclined toward the axial center of the rotating shaft at an angle 90-degrees different than that of the adjacent roller. This structure thus allows a single cross roller bearing assembly to support both the thrust and radial loads applied to the rotating shaft during the operation of the cam mechanism. Moreover, the relatively simple construction of the cross roller bearing largely eliminates the possibility of assembly errors during manufacture of the cam mechanism. A further benefit is that the roller retainer is securely maintained in position during rotation, without any play or looseness, due to the rollers supporting the retainer through their 90-degree alternating axial centers.

The invention is characterized by the provision of oil channels formed in the inner and outer races as means of both supplying oil to and discharging oil away from the rollers.

The invention is characterized by the rotating shaft being made of a highly rigid material that, due to its minimal distortion under load, allows the inner or outer race to be machined to a high degree of concentricity in relation to the rotating shaft because either race is installed to the shaft, or be integrally machined as part of the shaft, during the machining process. This structure and process are thus able to eliminate the bearing distortion that can be encountered when using a commercially available roller bearing assembly with an imperfectly formed inner race.

The invention is characterized by the rollers being cylindrical shape with both ends being flat and in parallel alignment.

The invention is characterized by a structure in which the inner and outer races provide means of supporting and guiding the rotation of the rollers through a particular structure wherein one side of the V-shaped race contacts the load bearing surface of the roller and the other side of the race does not contact the roller, but establishes a gap between the race and the end surface of the roller. This type of roller placement provides for a highly precise low-friction rotating bearing action between the rollers and races.

The invention is further characterized by multiple pocket orifices formed within the bearing retainer part, each pocket orifice providing means of positionally maintaining a roller within the retainer part and thus allowing the rollers to rotate without mutual contact.

The internally facing edges of the pocket orifices are formed with chamfered lip parts that run along the cylindrical bearing surface of the roller installed in the retainer part. This chamfered lip part establishes a specific path through which the roller can be inserted at the appropriate angle into the retainer part, and also provides a part that positionally supports the roller within the retainer part. Moreover, the lip part eliminates the need for clearance between the internal edges of the roller pocket and the roller, thus reducing play between the rollers and retainer part and providing means whereby the cam mechanism can operate with a greater degree of precision.

The inwardly facing edge of the pocket orifice is also concave in cross section, the concave part being formed concentrically with the cylindrical bearing surface of the installed roller. The roller may come into contact with the concave edges of the pocket orifice, or else uniform clearances can be established between the roller and concave pocket edges as means of maintaining an adequate oil film for bearing lubrication, thus further enhancing the operating precision of the cam mechanism.

A further characteristic of the invention is that the outer race is formed as a ring-shaped structure that surrounds the rotating shaft which is secured to the support structure. In cases where it may be difficult to form the outer race directly into the housing, a ring shaped structure formed separately from the housing may be utilized as an aid in fabricating the outer race to a high degree of dimensional accuracy.

The separate ring-shaped structure may be formed of multiple overlapping plates that constitute the outer race, thus providing for an assembly process in which the rollers can be easily inserted between the inner and outer races supported by the retainer part there between.

BRIEF DESCRIPTION OF THE DRAWING

FIG. 6 shows the assembled roller bearing and bearing retainer structure as presented in FIG. 1.

FIG. 7 shows two possible embodiments of the assembled roller bearing and bearing retainer structure presented in FIG. 1.

DESCRIPTION OF PREFERRED EMBODIMENTS

The following discussion will explain various embodiments of the invention with reference to the attached figures. FIGS. 1 through 4 depict the cross roller bearing structure invention utilized by the cam mechanism Generally, a cross roller bearing utilizes multiple cylindrical rollers arranged in alternating axial positions to form a radial pattern. The rollers are uniformly spaced and located between a rotating part and a supporting part with the rotating part maintaining the supporting part, thus forming a structure in which a radial gap is established between the aforesaid rotating part and supporting part. The rollers, for example, may rotate against an inner race formed on an internal ring installed to an internally located rotating part, and against an outer race formed on an external ring installed to an externally located supporting part. In cases where the rotating part radially encompasses the supporting part, the inner ring may be installed to the supporting part, and the outer ring to the externally located rotating part. In a cross roller bearing assembly, the axial centerlines of the rollers are inclined at a specific angle in relation to the rotating part with the axial centerline of each roller being inclined at a different angle in relation to that of the adjacent rollers. A roller bearing retainer is used to locate and support the rollers between the internal and external races. The type of cross roller bearing structure explained above is well known in the art.

Figure 3:
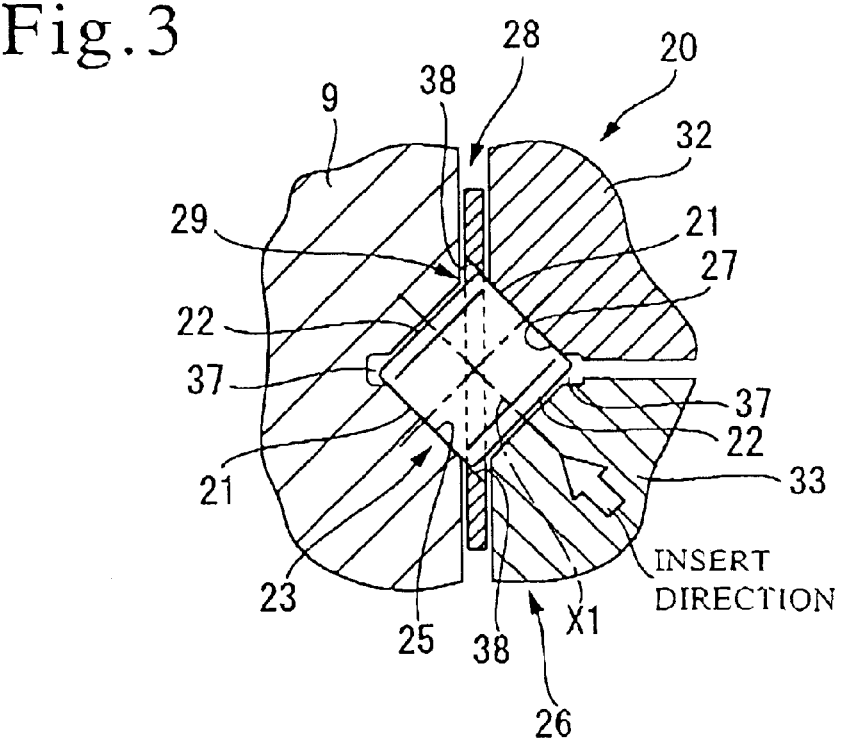
FIG. 3 is a detailed cross sectional view of an embodiment of the cross roller bearing structure shown in FIG. 1.
Figure 4:
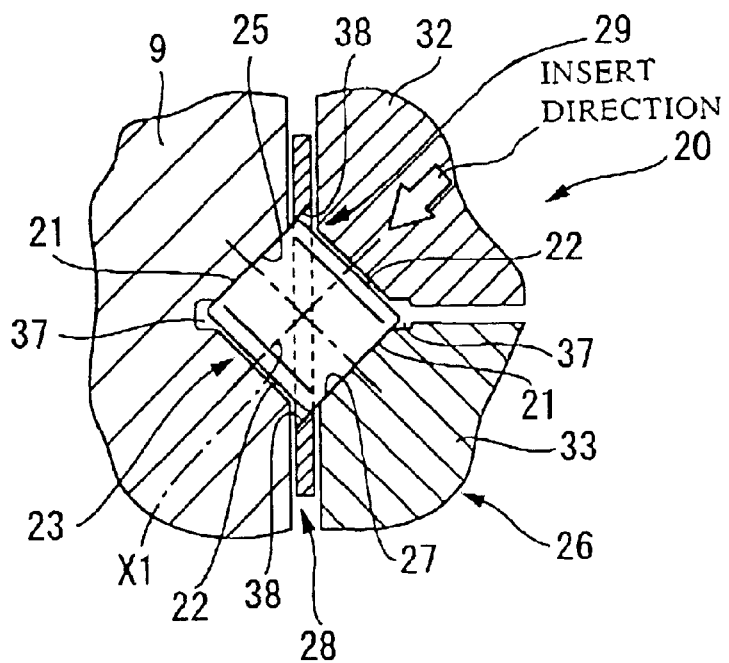
FIG. 4 is a detailed cross sectional view of an embodiment of the cross roller bearing structure shown in FIG. 1 differing from the embodiment shown in FIG. 3.

FIGS. 1 through 4 provide a graphic illustration of the specific type of cross bearing structure utilized by the invention. Each of multiple rollers 23 incorporate cylindrical bearing surface 21 and parallel end faces 22 located at both ends of cylindrical surface 21. In this embodiment the rotating part is comprised of turret 9 to which cam followers 8 are installed circumferentially on the radial axis. Rollers 23 are located between turret 9 and space 24 of housing 2 in a radial pattern with uniform spaces provided there between. Inner race 25 is formed on the radial circumference of turret 9. Ring plate assembly 26, which incorporates outer race 27, is fixedly attached to housing 2 within space 24 and surrounds the radial circumference of inner race 25. Rollers 23 are in contact with and rotate between inner race 25 and outer race 27. Furthermore, as shown in FIGS. 3 and 4, axial centerline x1 of roller 23 is inclined toward axial centerline x2 of turret 9, and axial centerline x1 of the adjacent roller 23 is inclined in the opposite direction toward axial centerline x2 of turret 9, thus forming a pattern in which the axial centerline of each roller is inclined in the opposite direction in relation to the adjacent rollers. A space is provided between the circumference of turret 9 and ring plate assembly 26 as means of providing clearance for the installation of thin cylindrical shaped retainer 28 that supports rollers 23. Multiple uniformly spaced pocket orifices 29 are formed within retainer 28 as means of locating each of rollers 23.

Although not completely shown in FIGS. 1 through 4, cam followers 8 are installed to the circumference of turret 9 in a radial pattern at mutual uniform intervals, and are located so as to mesh with a roller gear cam part of the cam mechanism. Ring boss 30 is fixedly installed to the exposed face of turret 9, its radial perimeter located diametrically inward of the turret perimeter as means of providing a sealing surface for ring-shaped oil seal 31 which resides between perimeter ring 30 and ring plate assembly 26. Ring plate assembly 26 is comprised of outer ring plate 32 and inner ring plate 33, plate 33 being concentrically located and installed beneath outer ring plate 32. Inner ring plate 33 is concentrically aligned within outer ring plate 32, and a gap is maintained between the facing surfaces of the two plates. Radial flange 34 extends from the perimeter of outer ring plate 32 to provide means by which clamp bolts 35 can be used to fixedly secure ring plate 32 to housing 2. Ring-shaped oil seal 31 is in contact with the inner perimeter of outer ring 32 and the outer perimeter of flange 34. Inner ring plate 33 is secured to outer ring plate 32 through bolts 36.

Outer race 27 is formed by the juxtaposition of the chamfered inner edge of outer ring plate 32 and chamfered outer edge of inner ring plate 33, the chamfered surfaces forming a V-shape in cross section. Outer race 27 is inclined toward axial center x2 of turret 9 to provide a contact face for the cylindrical surface of axially inclined roller 23, while race surface 22 maintains a clearance from the radial end surface of roller 23. Race 27 is thus able to provide an external support path for the rotation of roller 23.

Similarly, V-shaped inner race 25, formed on the radial surface of turret 9 facing outer race 27, provides both race surface 21 on which axially inclined roller 23 rotates, and surface 22 that maintains a clearance from the radial end face of roller 23, thus providing an internal support path for the rotation of roller 23. Internal race 25 is structured as a circular channel, V-shaped in cross section, formed directly into the circumferential surface of turret 9.

Narrow circular channel 37 is provided at the bottom of outer race 27 and inner race 25 as means of supplying and discharging lubricating oil to and from roller 23.

Pocket orifices 29 are provided in bearing retainer 28, each pocket orifice incorporating a tapered lip 38 that extends over cylindrical surface 21 of roller 23 as means of partially supporting and locating roller 23. When roller 23 is installed to retainer 28, cylindrical bearing surface 21 is maintained in contact with tapered lip 38 while radial end surface 22 is inclined toward orifice 29. Moreover, as tapered lip 38 is oriented in an alternate direction for each adjacent orifice 29, rollers 23 are only able to be inserted in the direction prescribed by the orientation of the tapered lip, thus allowing insertion of each roller 23 in only one specified and correct orientation. In other words, the structure of the bearing retainer establishes the correct orientation for the insertion and positioning of each roller, and maintains each roller in the appropriate axial orientation for assembly to the cam mechanism.

In a cam mechanism of the type that utilizes cross roller bearing assembly 20, it is desirable that inner race 25 be machining directly into the circumference of turret 9 at the same time that turret 9 itself is being machined. This method assures that the axial center of inner race 25 will be concentric with rotating center x2 of turret 9. In other words, inner race 25 is machined to the same center as turret 9 the same time that the turret 9 itself is machined.

Moreover, as turret 9 is fabricated from rigid high-strength steel, inner race 25 can be formed to a perfect circular shape with minimal process-induced distortion. This fabrication method eliminates the imperfections and dimensional imprecision commonly found in the inner races of standard commercially available roller bearing assemblies.

This type of cross roller bearing assembly put forth by the invention eliminates many of the deficiencies that have been responsible for the imprecise operation of conventional roller bearing assemblies, and allows the fabrication of a cam mechanism able to operate with an extremely high degree of precision.

Furthermore, because roller rotating axis x1 is inclined in relation to rotating axis x2 of turret 9, and because rotating axis x1 is inclined in an alternating direction for each successive roller, a single cross roller bearing assembly is able to support both radial and thrust loads applied to the turret, thus providing for a simplified cam mechanism structure that can be fabricated with fewer manufacturing errors.

Figure 5A:
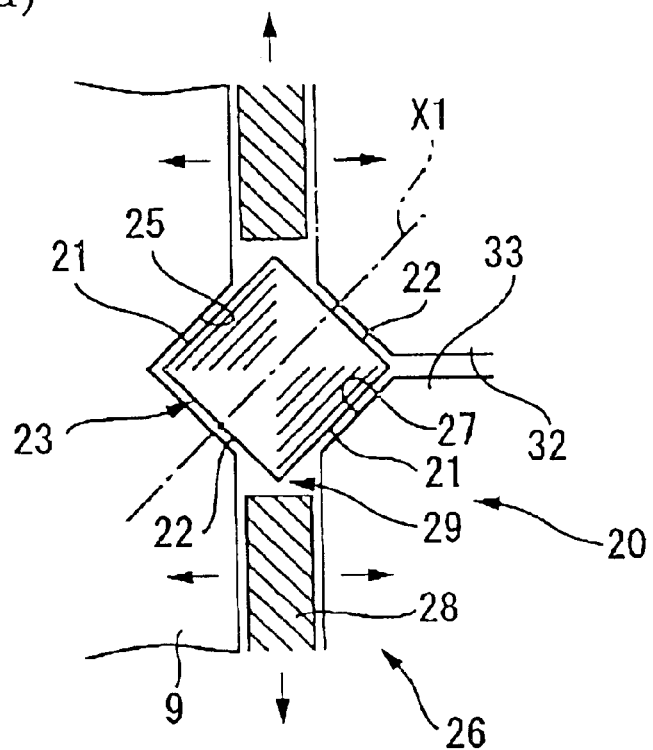
FIG. 5 shows two types of bearing and retainer assemblies for explanatory purposes.
Figure 5B:
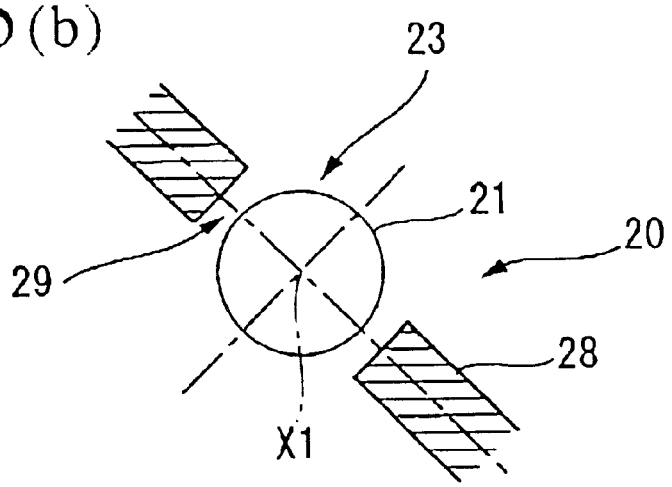

Moreover, in regard to the structure of the pocket orifice 29, FIG. 5a shows a bearing retainer pocket orifice formed larger than roller 23. This structure allows the roller to reside in the pocket in non-specific orientation, so the roller is able to move within the pocket orifice, thus resulting in a certain amount of bearing play. Moreover, bearing play is also generated because the pocket orifice is unable to restrain the position of the roller. Furthermore, as shown in FIG. 5b, the lubricating oil film can be easily broken as a result of the narrow line of contact between roller 23 and orifice 29.

FIG. 6a illustrates the bearing retainer structure put forth by the invention in which tapered lip 38 largely eliminates the gap between the roller and retainer, thus better stabilizing the rotational movement of the roller. Moreover, as shown in FIG. 7, each tapered lip in the retainer locates the roller on an axis different to that of the adjacent roller, thus preventing both unnecessary movement of bearing retainer 28 and the possibility of retainer 28 coming into contact with turret 9 or ring plate assembly 26. Furthermore, as shown in FIG. 6b, the end surface of lip 38 may be formed to a concave shape in cross section, a shape that may closely follow the round contour of the cylindrical bearing surface of roller 23. This concave contour, which can be formed so as to either contact the roller or establish a small clearance around it, provides means by which the lubricating oil film around the roller can be more effectively maintained. To summarize, the structures provide means by which unnecessary movement of roller 23 and retainer 28 can be reduced while simultaneously maintaining an adequate lubricating oil film around roller 23, thus allowing for the construction of a cam mechanism able to operate with a higher degree of precision compared to conventional types.

FIGS. 8 through 11 show cam mechanisms 1c and 1d that incorporate the cross roller bearing structure 20 put forth by the invention, and cam mechanism 61 that incorporates a rotating table.

Figure 8:
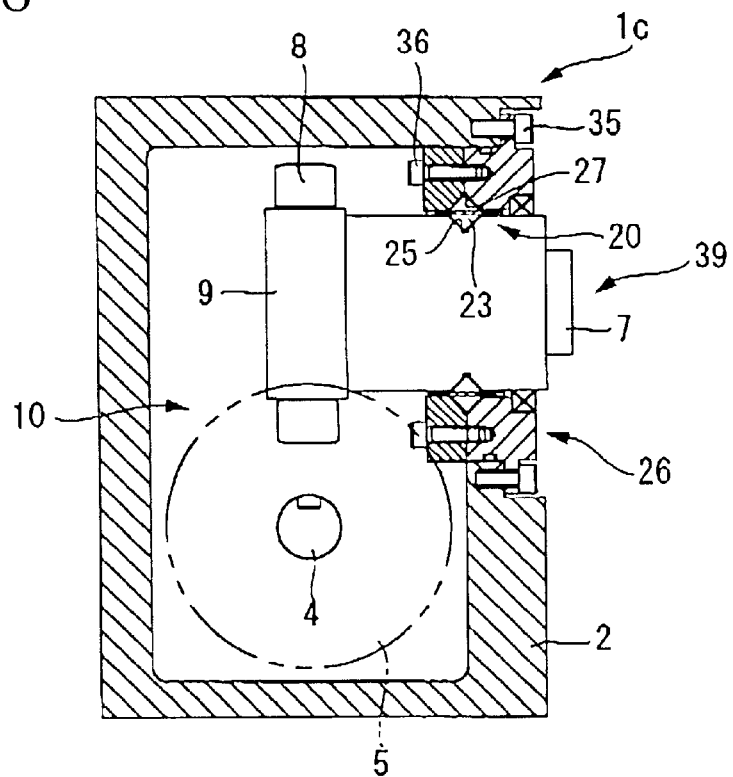
FIG. 8 shows one embodiment of the cam mechanism incorporating the bearing structure presented in FIG. 1.
Figure 20:
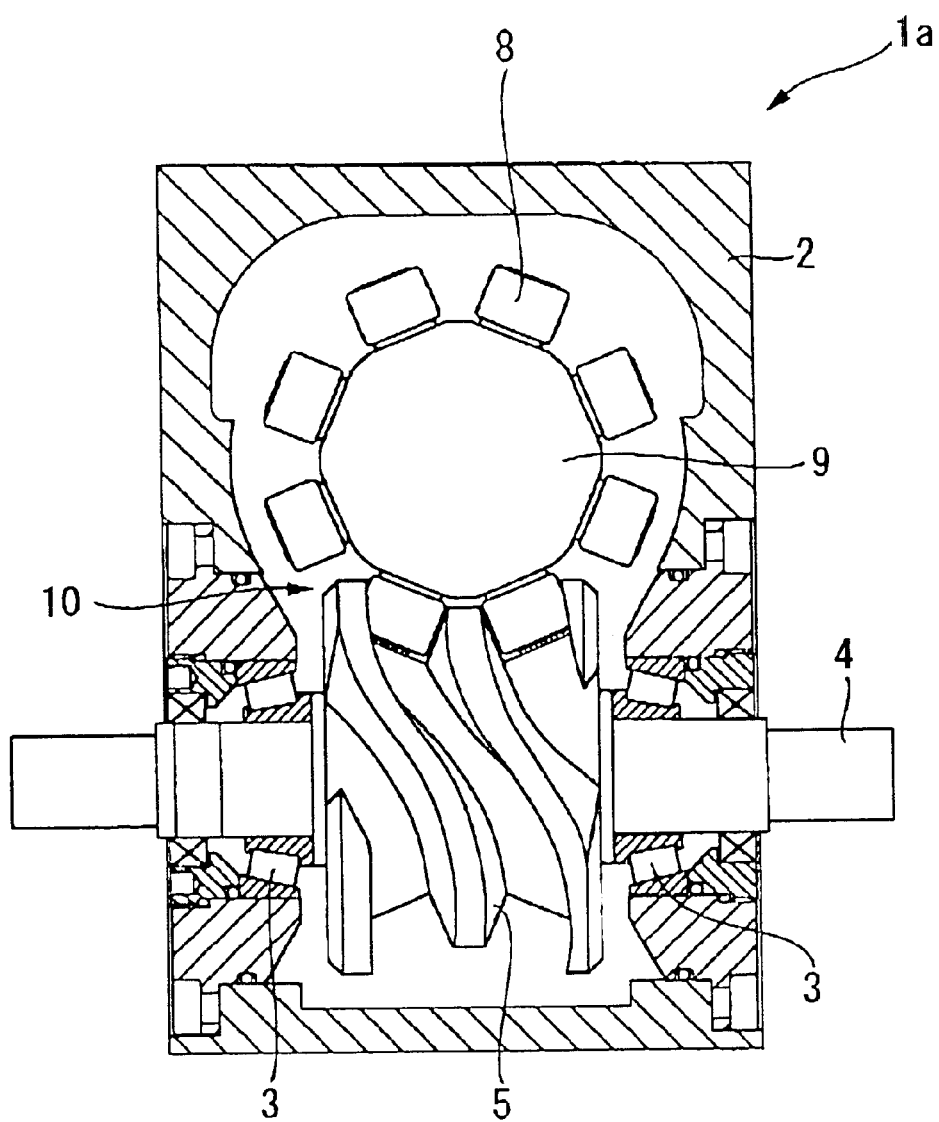
FIG. 20 is a lateral cross section of the output shaft assembly of a cam mechanism of the type currently known in the art.
Figure 21:
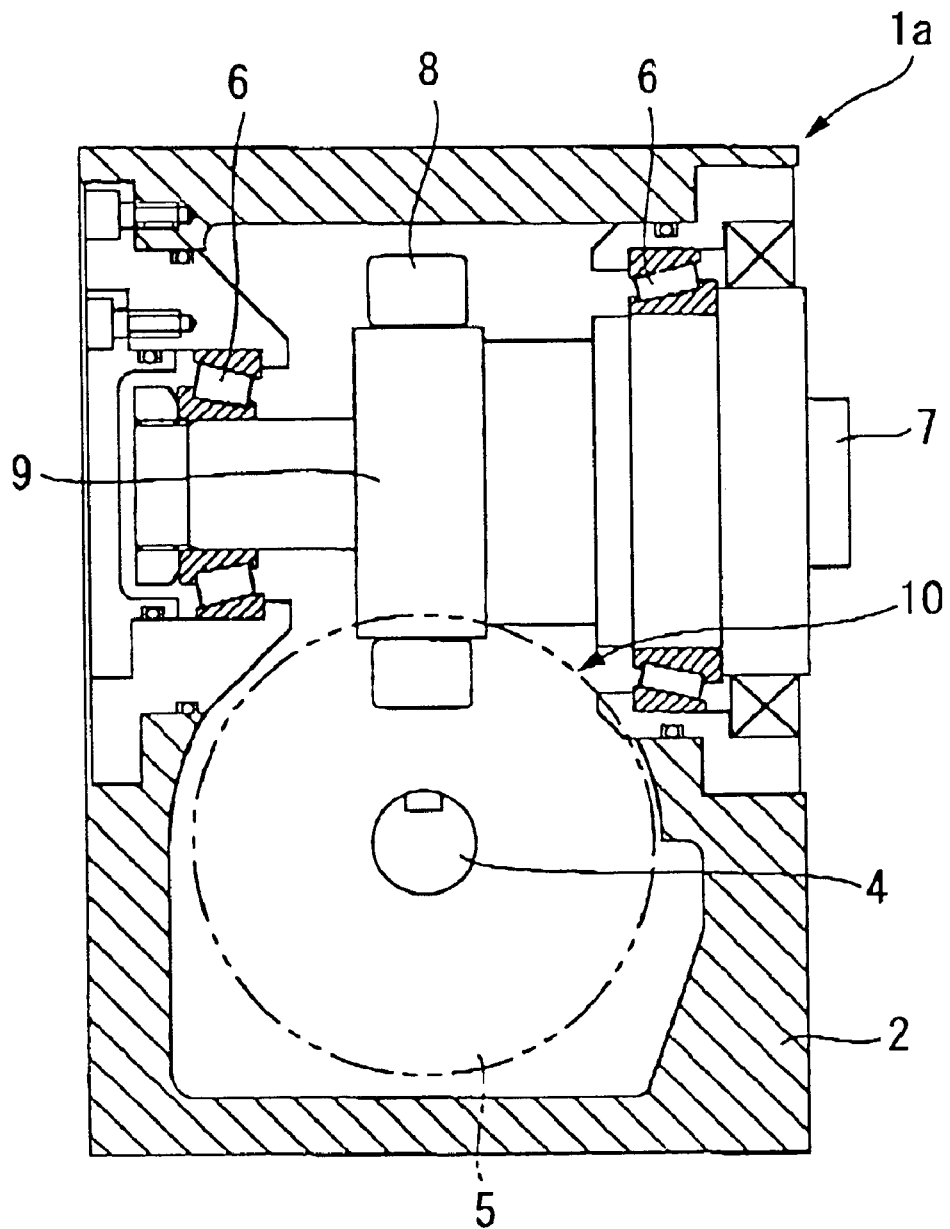
FIG. 21 is a plan cross section of the cam mechanism shown in FIG. 20.

FIG. 8 illustrates cam mechanism 1c that incorporates cross roller bearing assembly 20 instead of the conventional roller bearings used in cam mechanism 1a shown in FIG. 20 and 21. As a result of the cross roller bearing's ability to withstand both radial and thrust loads, turret 9 can be adequately supported on one side by a single cross bearing assembly. An additional advantage is that turret 9 can be installed to housing 2 as part of an output shaft assembly consisting of turret 9, cross roller bearing 20, and ring assembly 26. The output shaft assembly can be quickly and easily installed through bolts 35 that secure outer ring plate 32 to housing 2.

Figure 9:
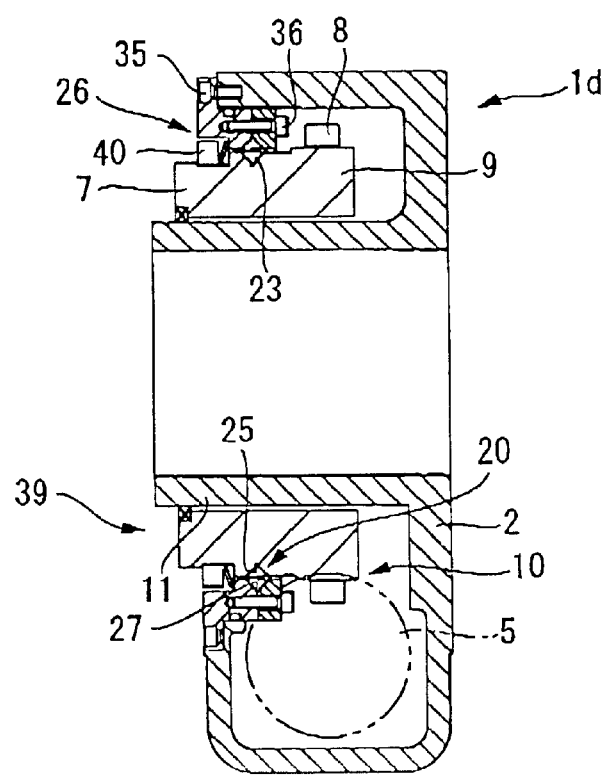
FIG. 9 is a cross sectional view of a different embodiment of the cam mechanism incorporated the bearing structure presented in FIG. 1.
Figure 22:
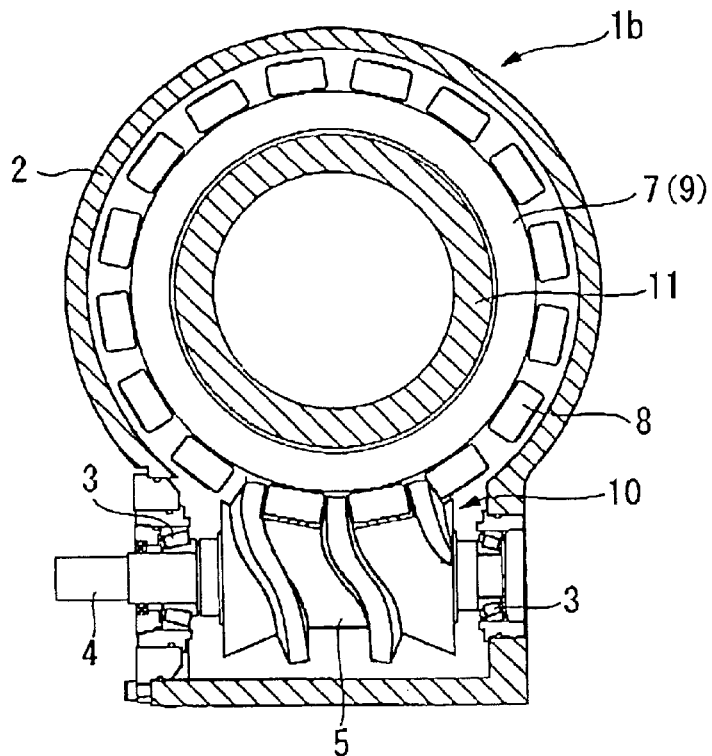
FIG. 22 is a lateral cross section of the output shaft assembly of another type of cam mechanism currently known in the art.
Figure 23:
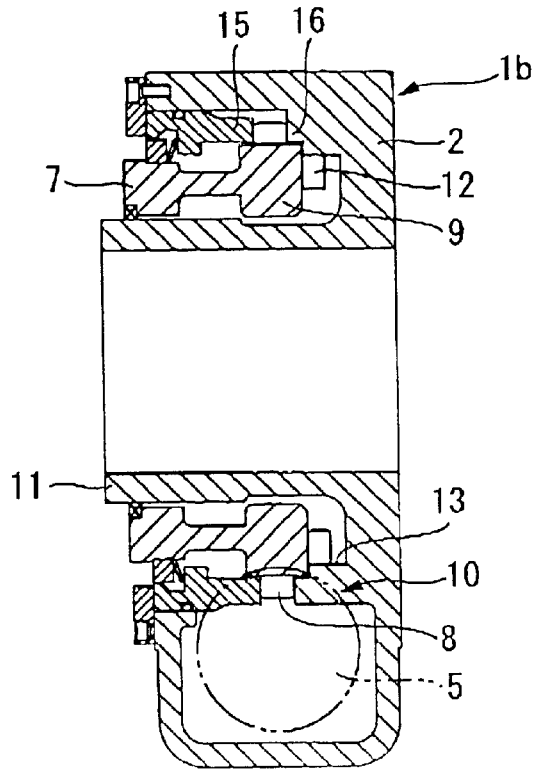
FIG. 23 is a lateral cross section of the cam mechanism shown in FIG. 22.
Figure 24:
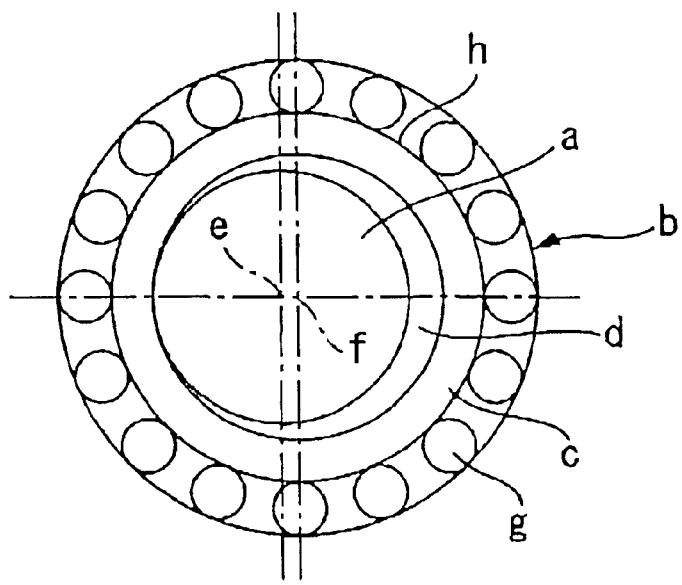
FIG. 24 is a diagram depicting one of the problems of a conventional bearing structure.
Figure 25:
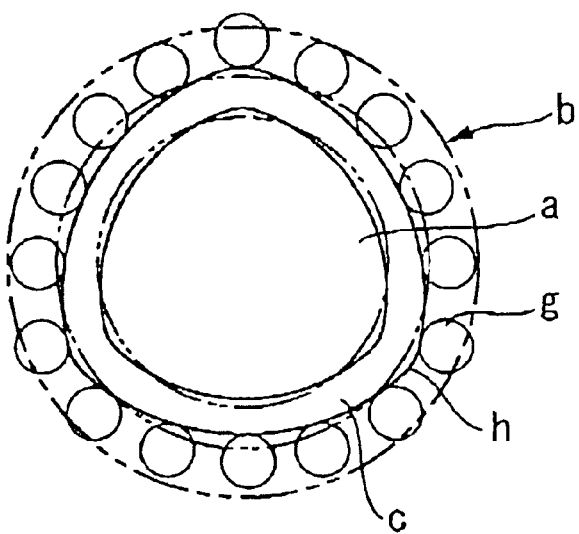
FIG. 25 is a diagram depicting another problem of a conventional bearing structure.
Figure 26:
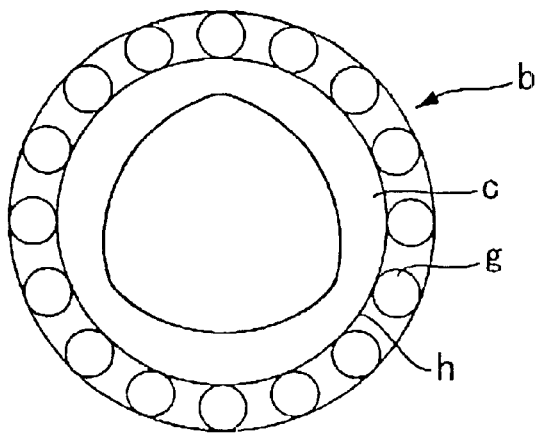
FIG. 26 is a diagram depicting still another problem of a conventional bearing structure.
Figure 26:
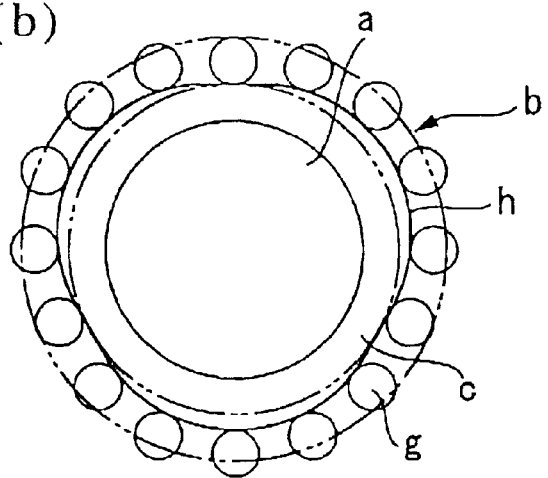
Figure 27:
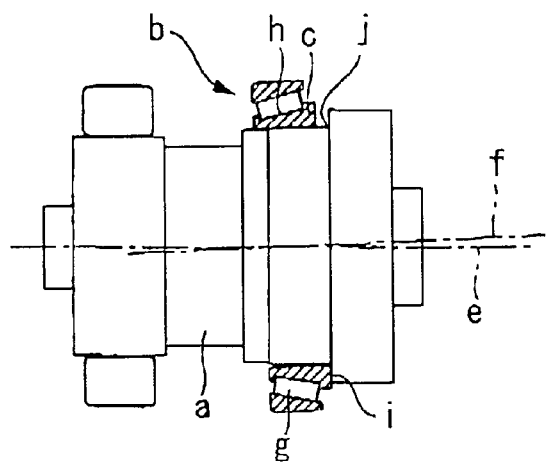
FIG. 27 is a diagram depicting an additional problem of a conventional bearing structure.

FIG. 9 illustrates cam mechanism 1d that incorporates a cross roller bearing type of output shaft support structure instead of the support structure consisting of cam followers 8 and 12 of cam mechanism 1a (shown in FIGS. 22 and 23). The use of a cross roller bearing makes it possible to adequately support output shaft assembly 39 at a single location at the axial center of the shaft's radial perimeter. Component 40 is an oil seal.

Figure 10:
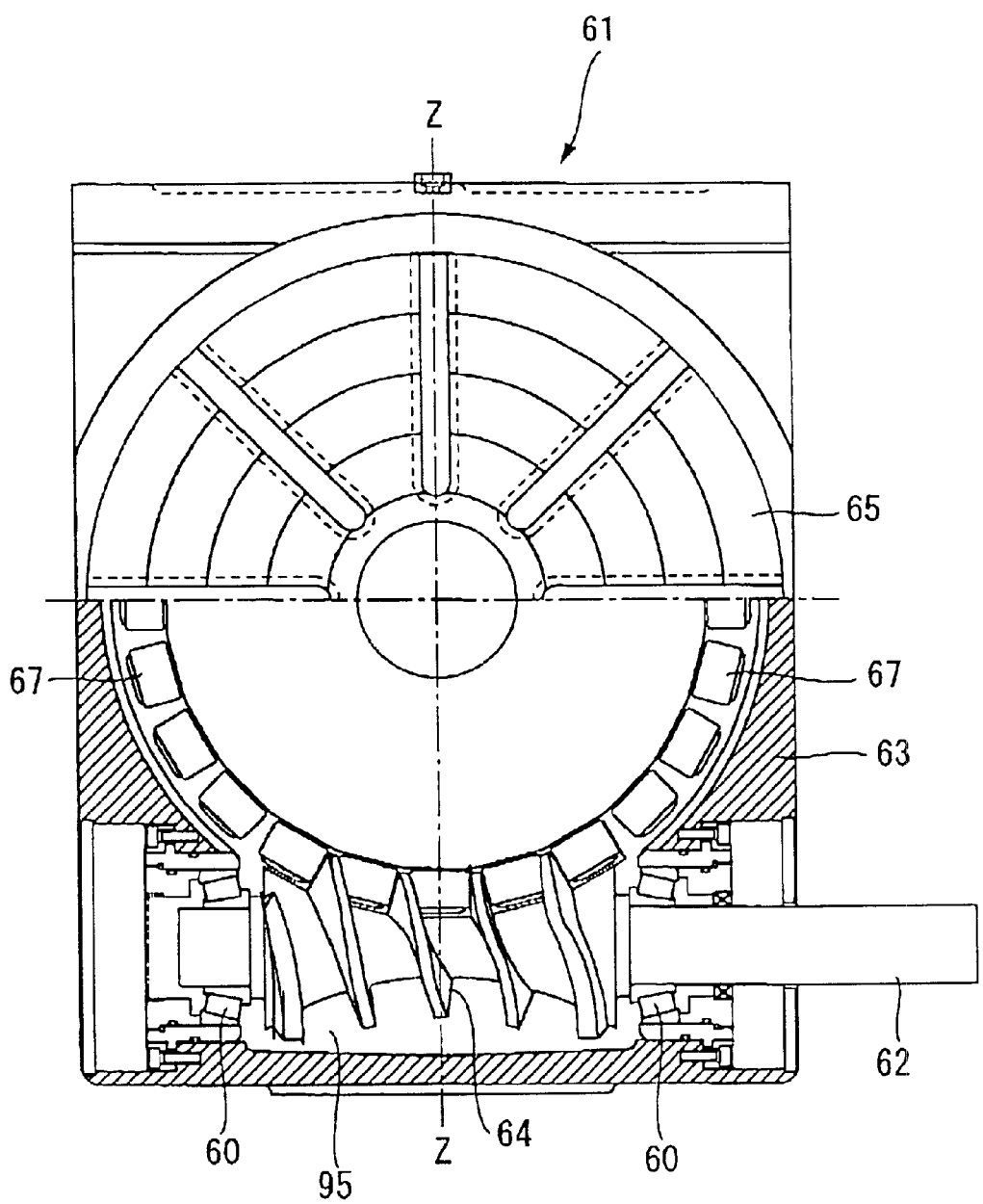
FIG. 10 is a plan view of a rotating table incorporated in the cam mechanism utilizing the bearing structure shown in FIG. 1.
Figure 11:
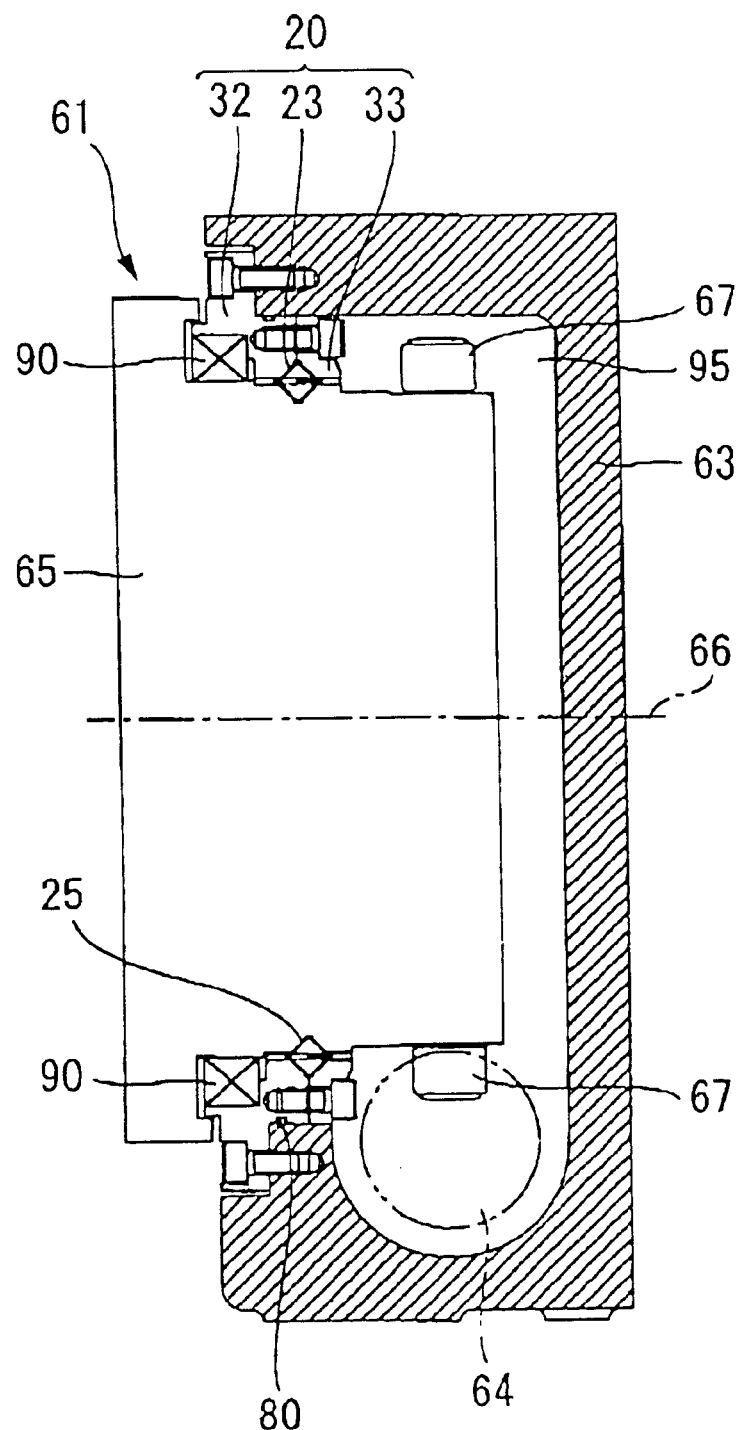
FIG. 11 is a cross sectional view taken from line Z—Z of FIG. 10.

FIGS. 10 and 11 depict an embodiment of the invention incorporating rotating table unit 61. Drive shaft 62, which incorporates roller gear cam 64, is rotatably supported in housing 63 by tapered roller bearings 60.

Revolving table 65, comprised of cross roller bearing 20, outer ring plate 32, inner ring plate 33, rollers 23, and inner race 25 formed as an integral part of table 65, is rotatably supported within housing 63 by cross roller bearing assembly 20. Bolts are utilized to fixedly secure outer ring plate 32 to housing 63, and inner ring plate 33 to outer ring plate 32. Multiple cam followers 67 are installed to the circumference of rotating table 65 in a radial pattern, and are oriented so as to fit between the spiral flanges of roller gear cam 64 on drive shaft 62. Space 95 is provided within housing 63 as means of holding lubricating oil for the lubrication of roller gear cam 64 and cam followers 67. Seal 90 and O-ring 80 are provided to prevent oil from leaking out of the cam mechanism.

Although not shown in the figures, a motor or like drive means is utilized to rotate drive shaft 62 and roller gear cam 64. The traversing action of the cam flanges is converted to a rotating movement of revolving table 65 through the following movement of cam followers 67, thus resulting in the rotation of table 65 around axial centerline 66.

Various embodiments of the turret attachment structure are shown in FIGS. 12 through 22. FIGS. 12 through 15 illustrate variations of the turret attachment structure that can be applied to cam mechanism 1c shown in FIG. 8. FIGS. 16 through 19 illustrate variations of the turret attachment structure that can be applied to cam mechanism 1d shown in FIG. 9.

Figure 1:
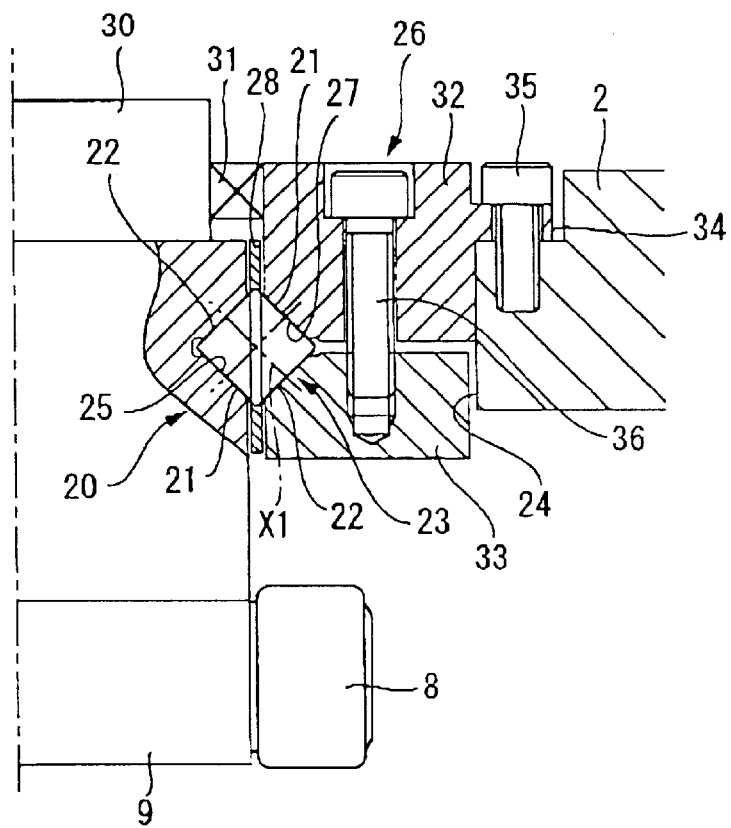
FIG. 1 is a cross sectional view of an embodiment of the bearing structure of the invention.
Figure 2:
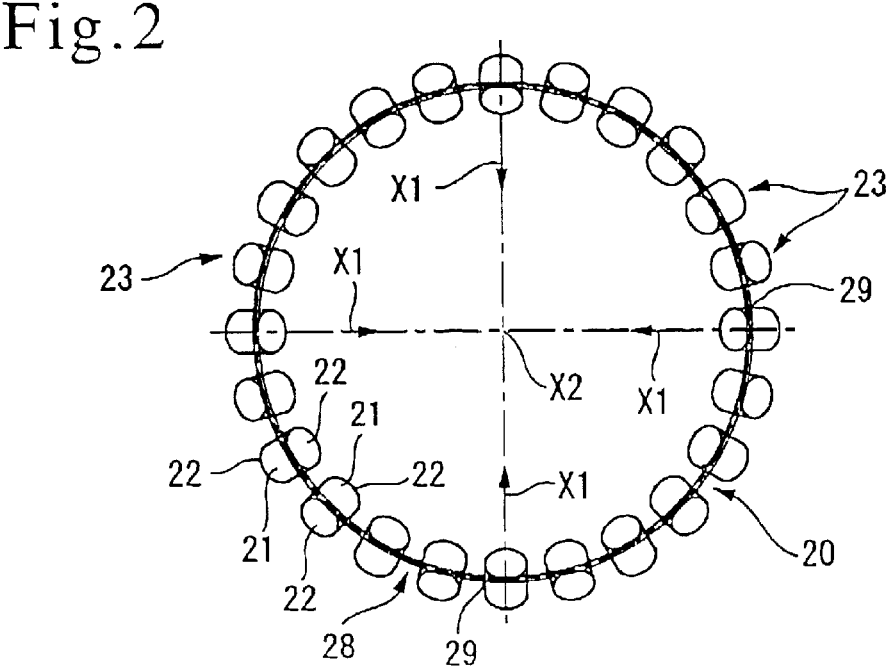
FIG. 2 is a plan view of the rollers and roller retainer part of the bearing structure shown in FIG. 1.
Figure 12A:
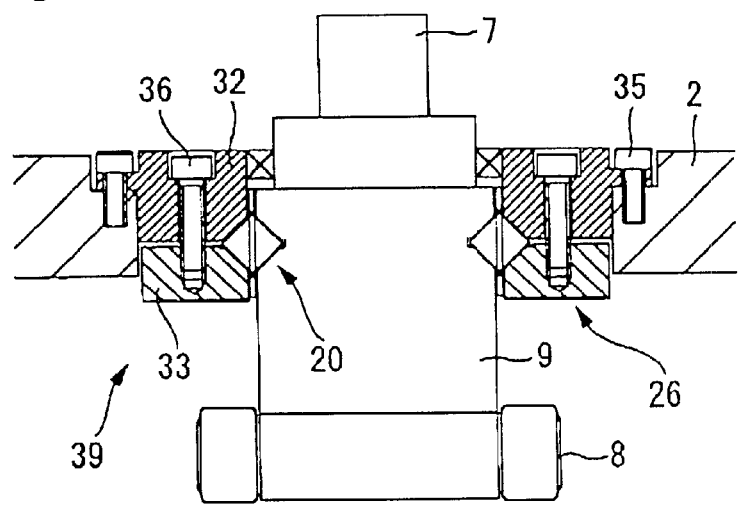
FIG. 12 is an explanatory diagram of the assembled bearing structure and output shaft of the cam mechanism shown in FIG. 8.

FIG. 12a depicts the same attachment structure previously shown in FIG. 1, a structure in which bolts 36, inserted through outer ring plate 32, are used to secure inner ring plate 33 to the outer ring plate. After output shaft assembly 39 is installed to housing 2 by bolts 35, bolts 36 can be tightened to their final torque specification to complete the assembly of cross bearing unit 20 by establishing an adjustable gap between the inner and outer ring plates.

Figure 12B:
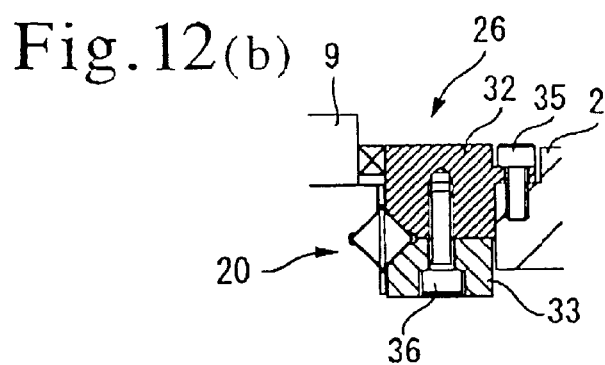

FIG. 12b depicts the same attachment structure shown previously in FIG. 8, a structure in which bolts 36, inserted up through inner ring plate 33, are threaded into outer ring plate 32 as means of securing inner ring plate 33 to plate 32. In this case, inner ring plate 33 is completely assembled to outer ring plate 32 before the bearing assembly is installed to housing 2.

Figure 13:
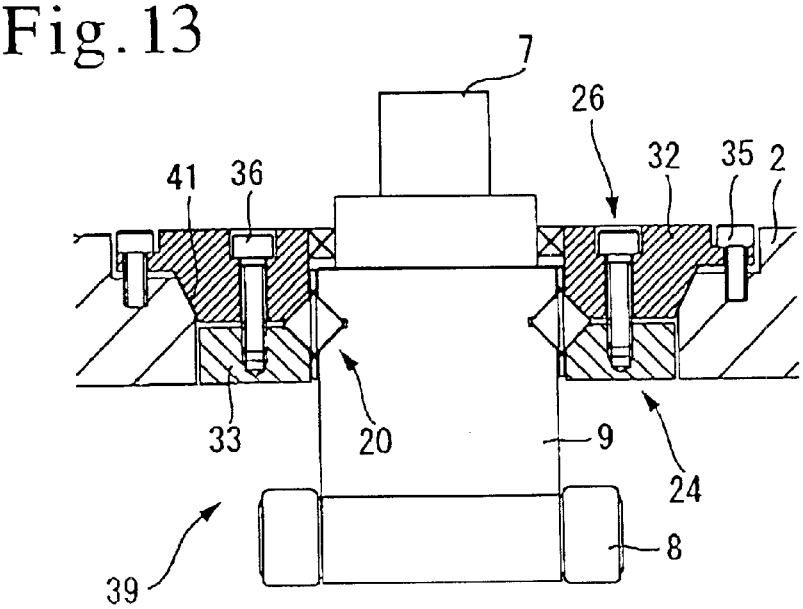
FIG. 13 is a cross sectional view of the assembled bearing structure and output shaft of the cam mechanism shown in FIG. 8.

FIG. 13 depicts an output shaft assembly mounting structure in which outer ring plate 32 and housing 2 are formed with inclined cone shaped contact surfaces as means of aligning output shaft assembly 39 with the mounting 24 bore of housing 2.

Figure 14A:
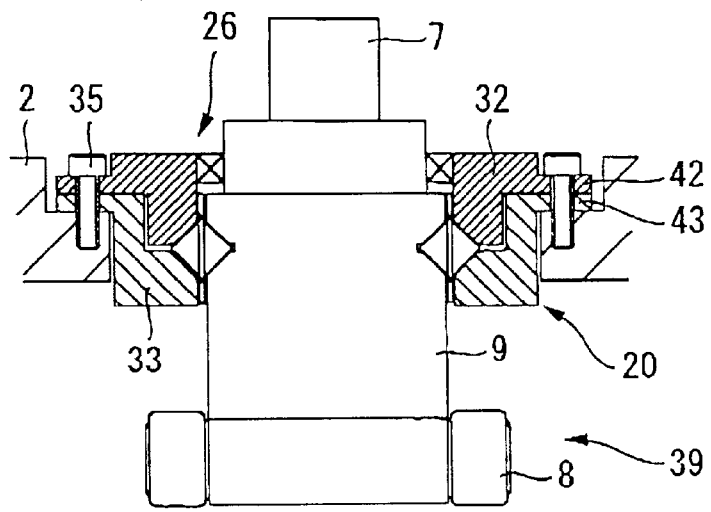
FIG. 14 is an explanatory diagram of another type of assembled bearing structure and output shaft of the cam mechanism shown in FIG. 8.
Figure 14B:
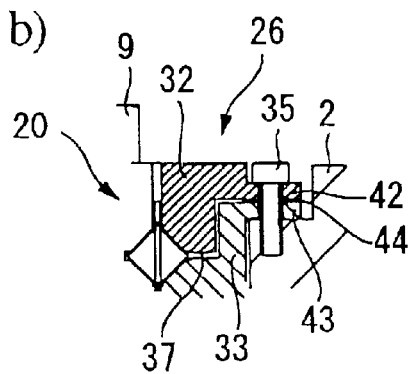

FIG. 14a illustrates an output shaft assembly mounting structure in which both outer ring plate 32 and inner ring plate 33 are secured to housing 2 through bolts 35 installed through aligned holes provided in the outer and inner plates, and threaded into tapped bores in housing 2. This structure allows outer and inner ring plates 32 and 33 and output shaft assembly 39 to be assembled and installed to housing 2 simultaneously. Radial flanges 42 and 43 are provided on ring plates 32 and 33 respectively as means of providing a surface through which bolts 35 can be installed. Ring-shaped spacer 44 can be installed between flanges 42 and 43 (FIG. 14b) as means of adjusting the width of gap 37.

Figure 15:
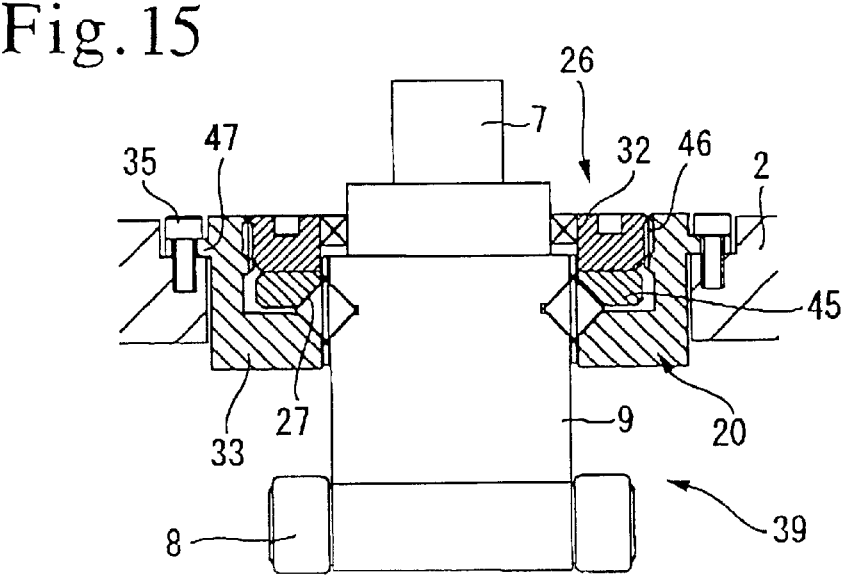
FIG. 15 is a cross sectional view of another type of assembled bearing structure and output shaft that can be incorporated into the cam mechanism shown in FIG. 8.

FIG. 15 illustrates an output shaft assembly in which inner ring plate 33 is a cylindrical structure that resides within the output shaft mounting bore provided in housing 2. Ring-shaped collar 45, formed as part of outer ring plate 32, is located above the internal radial surface of inner ring plate 33. Outer ring plate 32 is formed with a large diameter circumferential male thread that allows plate 32 to be screwed into a corresponding female thread formed within inner ring plate 33, thus providing a threaded means of connecting the two ring plates. Output shaft assembly 39 is installed to housing 2 by means of radial flange 47, formed as an extension of the perimeter of inner ring plate 33, being fixedly secured to housing 2 by bolts 35. The large diameter threaded connection between plate 32 and 33 allows the cross bearing assembly to be installed or removed by simply screwing in or unscrewing collar 45.

FIGS. 16 through 19 depict various output shaft structures that can be applied to the cam mechanism shown in FIG. 9 in which cross roller bearing 20 is attached to and sealed within housing 2.

Figure 16:
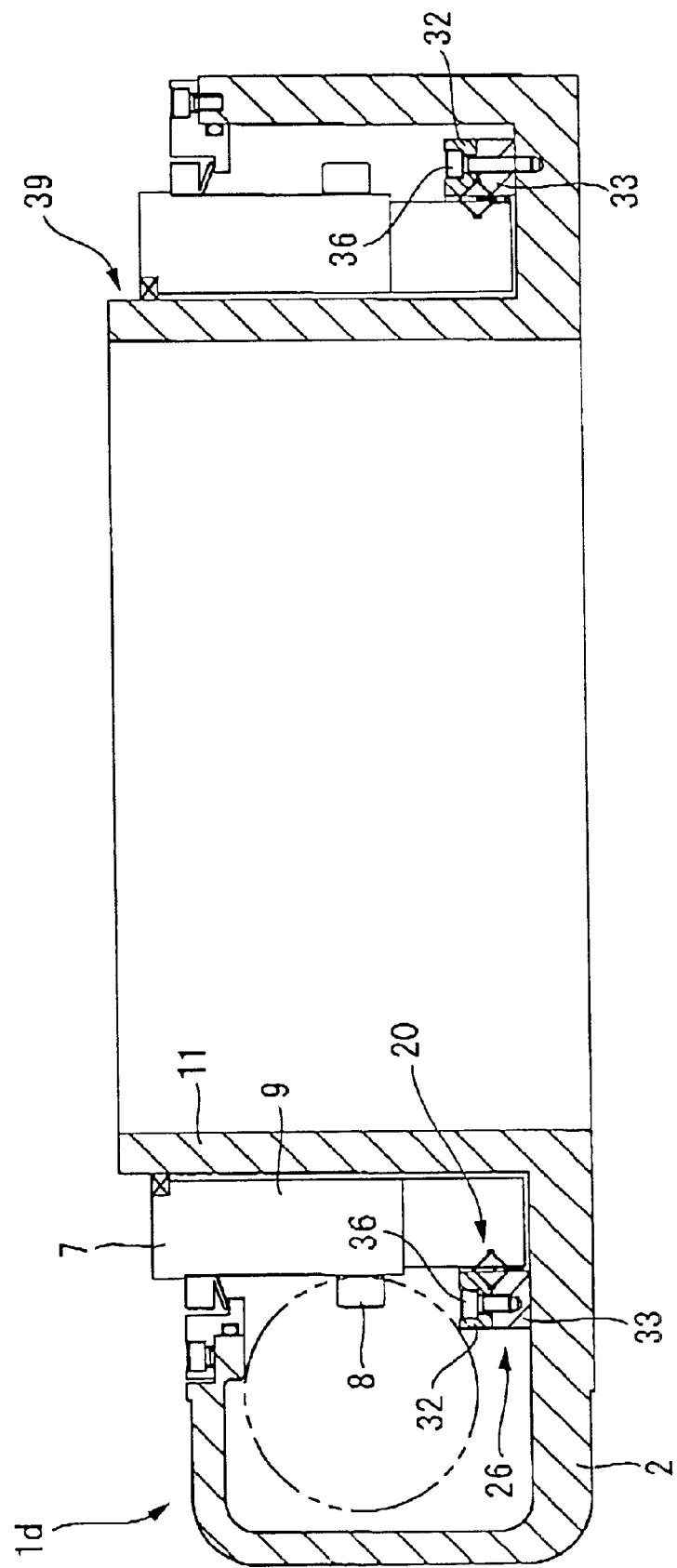
FIG. 16 is a cross sectional view of the assembled bearing structure and output shaft of the cam mechanism shown in FIG. 9.

FIG. 16 depicts a structure in which multiple bolts 36 secure ring plate assembly 26 to housing 2 by clamping assembly 26 to housing 2 through tapped holes provided in housing 2, and in which bolts 36 also fasten ring plate 32 to ring plate 33 by means of tapped holes provided in plate 33, thus forming a structure whereby ring plates 32 and 33 can be mutually assembled at the same time that output shaft assembly 39 is installed to housing 2.

Figure 17:
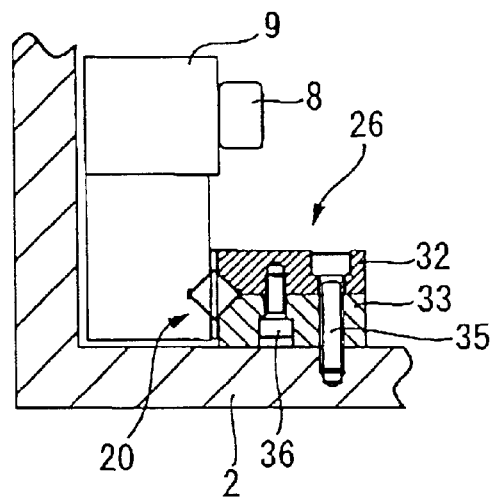
FIG. 17 is a cross sectional view of another type of assembled bearing structure and output shaft that can be incorporated into the cam mechanism shown in FIG. 9.

In the structure shown in FIG. 17, output shaft assembly 39 is formed by ring plate 33 being clamped to ring plate 32 by bolts 36 that insert inwardly toward the axial center of output shaft 9 through ring plate 33 and thread into tapped holes provided in ring plate 32. Output shaft assembly 39 is attached to housing 2 by means of bolts 35 that pass through ring plate assembly 26, in the opposite direction to bolts 36, and screw into tapped holes provided in housing 2. In this structure, ring plates 32 and 33 are joined together with bolts 36 before ring assembly 26 is installed to housing 2.

Figure 18:
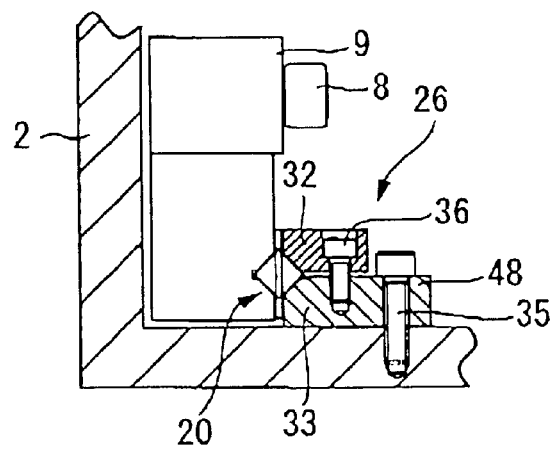
FIG. 18 is a cross sectional view of another type of assembled bearing and output shaft structure that can be incorporated into the cam mechanism shown in FIG. 9.

In the structure shown in FIG. 18, ring plate 32 is clamped to ring plate 33 by bolts 36 that run through ring plate 32 and into threaded bores formed in ring plate 33, thus forming output shaft assembly 39 which is secured to housing 2 through bolts 35 that clamp radial flange 48 of ring plate 33 to housing 2 by anchoring to tapped bores provided in housing 2. In this structure, a gap is provided between the facing surfaces of ring plates 32 and 33, thereby providing means of adjusting the size of the gap through the amount of torque applied by bolts 36.

Figure 19:
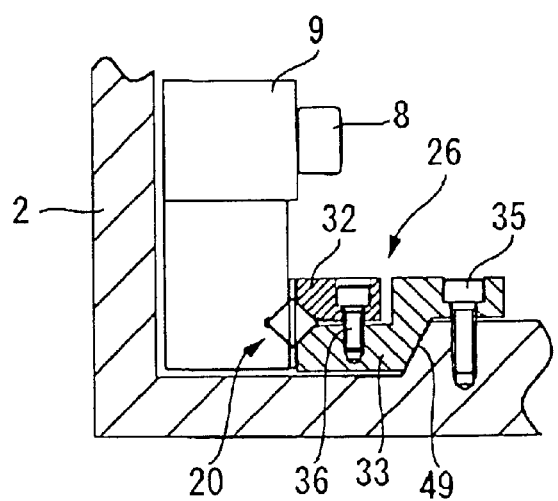
FIG. 19 is a cross sectional view of another type of assembled bearing and output shaft structure that can be incorporated into the cam mechanism shown in FIG. 9.

FIG. 19 illustrates a modified version of the structure shown in FIG. 18. Ring plate 33 incorporates conical surface 49 that mates with a corresponding conical surface 49 formed on housing 2, thus providing means of accurately positioning output shaft unit 39 within housing 2.

While the various embodiments of the cam mechanism put forth in this specification explain a design in which ring plate assembly 26 is structured so as to radially encompass the perimeter of turret 9 with race 27 provided as the outer race, this structure by no means limits the scope of the invention. The output shaft may also take the form of housing 2 itself, and turret 9 may be structured so as to radially surround the rotating output shaft. The inner race 25 may be provided on housing 2, and the outer race 27 may be machined directly into turret 9.

The cross bearing assembly explained in this specification provides a particular benefit when installed to a cam mechanism in that the operating qualities of the cross bearing structure allow the output shaft of the cam mechanism to maintain its positional stability while moving with an extremely high degree of dynamic precision. More specifically, the cross bearing assembly can provide a significant increase in the operational stability and precision of cam mechanisms of the type that utilize a roller gear cam input shaft.

What is the claimed is:

1. A cam mechanism comprised of a cam-driven rotating shaft mounted on a support structure and rotatably supported by a cross roller bearing assembly wherein, said cross roller bearing assembly is comprised of an outer V-shaped race part, an inner V-shaped race part, multiple rotatable rollers residing between and located by said outer and inner race parts, and a roller retainer part also residing between said outer and inner race parts, and wherein, either said outer or inner race part exists as a circumferential groove formed on a perimeter of said rotating shaft.

2. A cam mechanism claimed in claim 1 wherein said circumferential groove is machined directly into the perimeter of said rotating shaft at the same time that said shaft is machined in its entirety.

3. A cam mechanism claimed in claim 1 wherein rotating axes of said rollers are alternately offset at different angles, whereby a roller inclined toward said rotating shaft is located adjacent to a roller having an axis disposed 90-degrees differently.

4. A cam mechanism claimed in claim 1 wherein a channel is provided on said outer and/or inner race part as means of supplying oil to and discharging oil from said rollers.

5. A cam mechanism claimed in claim 1 wherein said rotating shaft is formed from a highly rigid material.

6. A cam mechanism claimed in claim 1 wherein said rollers are cylindrical in shape and incorporate mutually parallel flat end surfaces.

7. A cam mechanism claimed in claim 6 wherein said V-shaped outer or inner race part maintains contact with the cylindrical bearing surface of said roller and establishes a separating distance from the flat end surface of said roller.

8. A cam mechanism claimed in claim 6 wherein said roller retainer part incorporates multiple pocket orifices as means of separately supporting and locating each of said rollers.

9. A cam mechanism claimed in claim 8 wherein each of said pocket orifices incorporates a tapered inner lip part that extends around the cylindrical bearing surface of each of said rollers, said tapered inner lip part defining an insertion direction of each of said rollers and supporting the cylindrical bearing surface of each of said rollers.

10. A cam mechanism claimed in claim 8 wherein each of said pocket orifices incorporates inner edge extremities formed to a concave shape in cross section, said concave cross section being concentric to the cylindrical bearing surface of each of said rollers.

11. A cam mechanism claimed in claim 1 wherein said outer race is formed as an external ring-shaped structure that is installed around the perimeter of said rotating shaft mounted on said support structure.

12. A cam mechanism claimed in claim 11 wherein said external ring-shaped structure is comprised of multiple overlapping plate parts.

* * * * *